United States Patent
Morel et al.

(12)

(10) Patent No.: US 6,314,656 B1
(45) Date of Patent: Nov. 13, 2001

(54) DEVICE FOR POSITIONING AND CENTERING

(75) Inventors: Michel Morel, Ermont; Fabrice Roudier, Juziers, both of (FR)

(73) Assignee: Genus Technologies, Chatillon (FR)

( * ) Notice: Subject to any disclaimer, the term of this patent is extended or adjusted under 35 U.S.C. 154(b) by 0 days.

(21) Appl. No.: 09/349,250

(22) Filed: Jul. 8, 1999

(30) Foreign Application Priority Data

Jul. 10, 1998 (FR) .................................................. 98 08868

(51) Int. Cl.$^7$ ....................................................... G01D 21/00
(52) U.S. Cl. .................................................. 33/644; 33/520
(58) Field of Search ............................. 33/520, 613, 623, 33/644, 645, 542, 544, 544.2

(56) References Cited

U.S. PATENT DOCUMENTS

| 1,274,647 | * | 8/1918 | Whipple | 33/675 |
| 2,599,819 | * | 6/1952 | Fisher | 33/675 |
| 2,842,860 | * | 7/1958 | Gray | 33/520 |
| 3,345,755 | * | 10/1967 | Ferebee | 33/675 |
| 3,975,830 | * | 8/1976 | Lopacki | 33/520 |
| 4,356,635 | * | 11/1982 | Chung | 33/632 |
| 5,377,421 | * | 1/1995 | Isler | 33/542 |
| 5,437,105 | * | 8/1995 | Work | 33/644 |

FOREIGN PATENT DOCUMENTS

| 297 00 886 | 4/1997 | (DE) . |
| 2 757 437 | 6/1998 | (FR) . |

\* cited by examiner

*Primary Examiner*—Jacob K. Ackun, Jr.
*Assistant Examiner*—Faye Francis
(74) *Attorney, Agent, or Firm*—Young & Thompson

(57) ABSTRACT

A device for positioning and centering, particularly for automobile body work pieces, comprises a body 1 with an actuating means 2 to actuate centering means 3 adapted to move between a near disengagement position and a spaced centering position, the centering means 3 being displaced by slidably mounted elements 7, 8 and forming an angle with the direction of movement of the actuating means 2.

3 Claims, 3 Drawing Sheets

Figure 1:
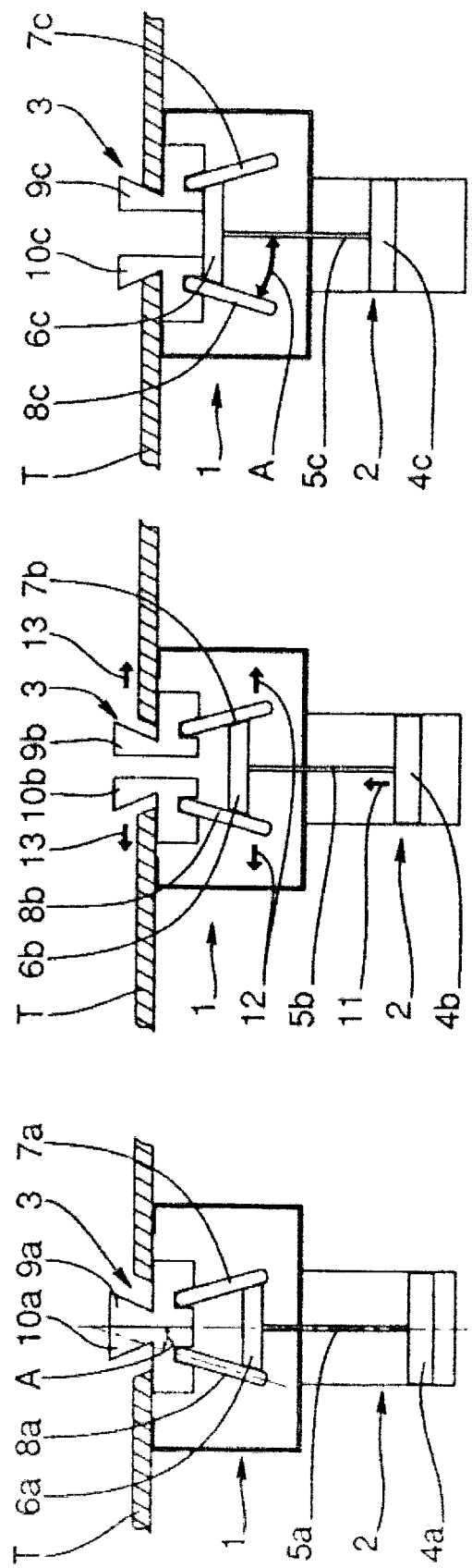

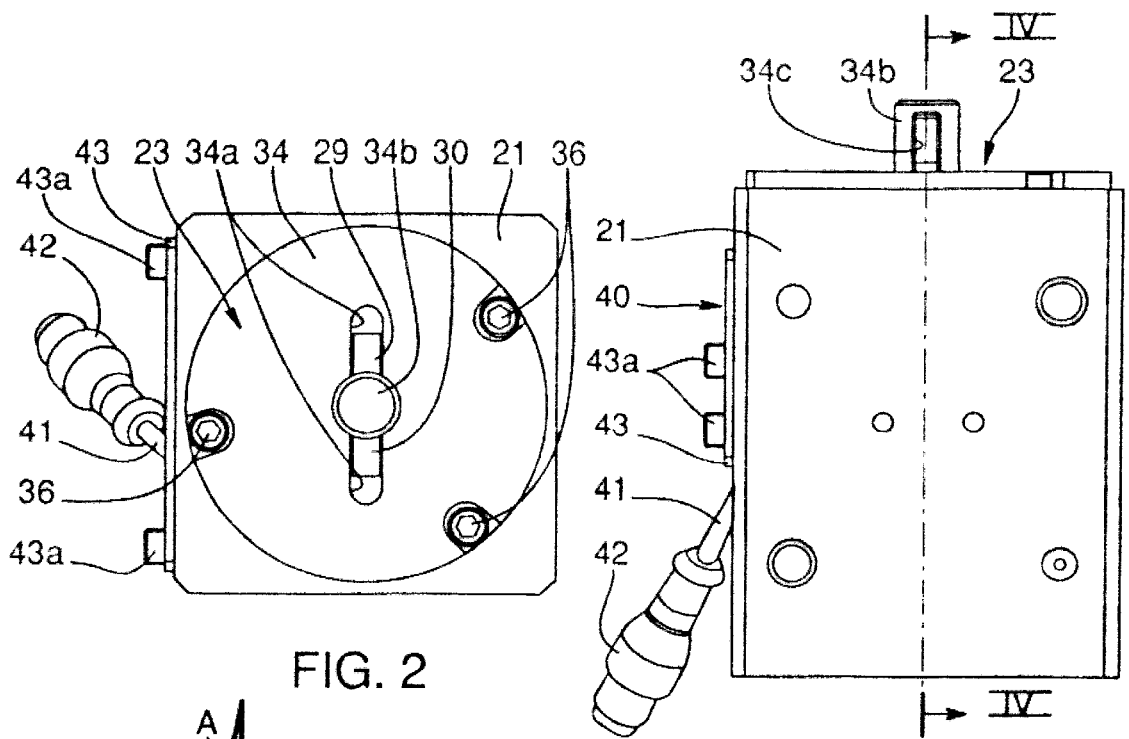
FIG. 2
FIG. 3
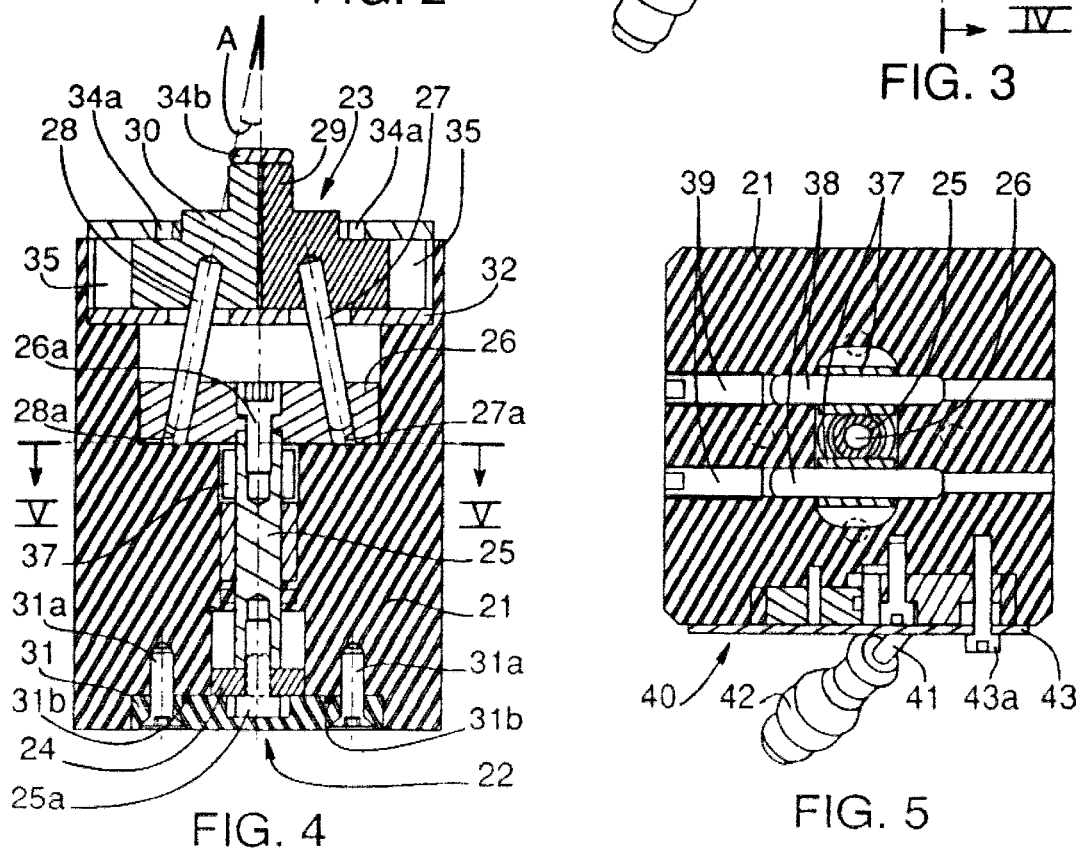
FIG. 4
FIG. 5

DEVICE FOR POSITIONING AND CENTERING

The invention relates to a device for positioning and centering, particularly of a piece for automobile body work, of the type comprising a body having an actuating means to actuate the centering means adapted to move between a near position in which the piece is disengaged and a spaced centering position for the piece.

There are known devices of this type, generally called "guide carriers" by specialists: these known devices generally comprise a jack, preferably pneumatic, a detection module for the raised and lowered positions, holding means in center position of the piece and a casing for movement comprising at least two pieces adapted to move between a near disengaged position and a spaced centering position.

The displacement of said pieces generally takes place along a path comprised between 2 and 100 mm, the sought accuracy of centering is preferably better than 0.05 mm, whilst the holding force in centered position is generally less than 100 daN.

Because the displacement of said pieces takes place transversely to the direction of movement of the actuating means, mechanical transmission means are necessary to translate the movement of the actuating jack and to obtain movement of said pieces: these movement translating means are generally constituted by cams, levers or swinging squares articulated about an axle secured to the body of the device.

In practice, the desired accuracy of 0.05 mm for centering is difficult to obtain by existing devices, given the need to take particular precautions for wear, which increases its cost of production.

The invention has for its object to overcome the drawbacks of the prior art, by providing an improved device, simple to produce and economical, permitting obtaining the desired accuracy or even better, without excessive cost of production.

The invention has for its object a device for positioning and centering, particularly a piece of automobile body work, of the type comprising a body with at least one actuating means to actuate the centering means, adapted to move between a near disengaged position and a spaced centering position, characterized by the fact that the centering means are moved by elements mounted slidably and making an angle with the direction of movement of the actuating means so as to improve the accuracy and the concentricity of the centering to be obtained.

According to other characteristics of the invention:
- each centering means is slidably mounted in a guide slot,
- each centering means is slidably mounted relative to a cover beneath a protective member substantially sealed against impurities, dirt, cuttings or the like,
- each element forming an angle with the direction of movement of the actuating means is mounted captively relative to a centering means and is mounted slidably relative to a head secured to the actuating means,
- each element making an angle with the direction of movement of the actuating means is mounted captively relative to a head secured to the actuating means and mounted slidably relative to a centering means,
- the angle formed by one element with the direction of the actuating means is less than a predetermined value of about five degrees of arc, so as to obtain self-blocking of the element in case of inoperativeness or release of the actuating means,
- the device comprises resilient anti-reversing blocking means, so as to maintain the centering obtained in the case of release or ineffectiveness of the actuating means,
- the device comprises an arrangement in which the centering means are mounted captively and displaceably, and this arrangement has passage openings for said slidably mounted elements,
- said arrangement has a removable cover and a base comprising said passage openings,
- the slidably mounted elements are moved apart radially by a head secured to the actuating means.

Figure 6:
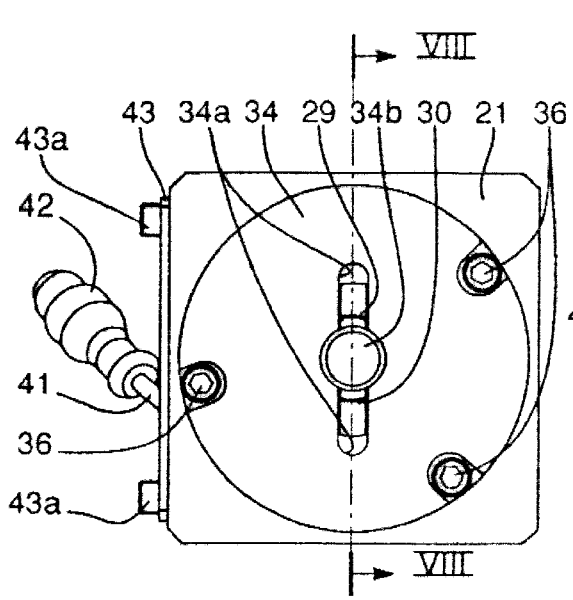
Figure 7:
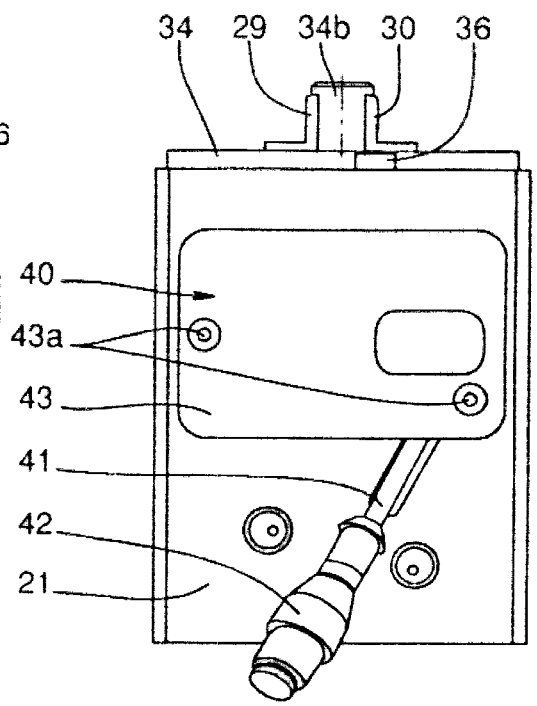
Figure 8:
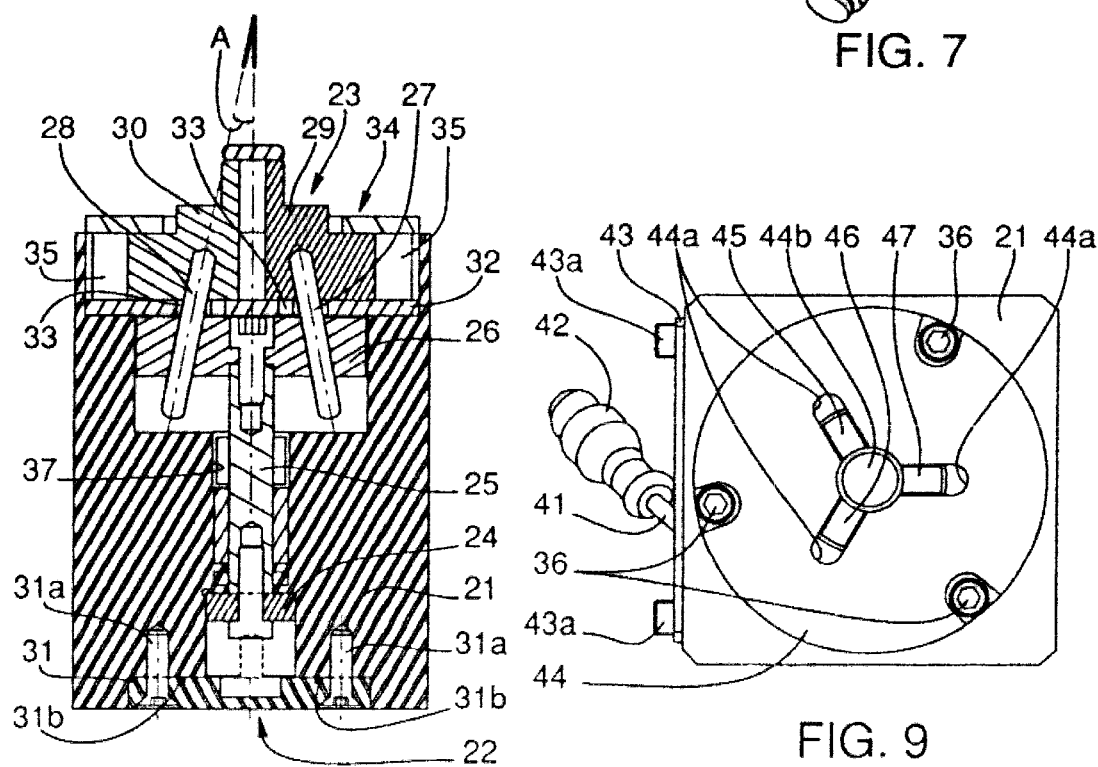
Figure 9:
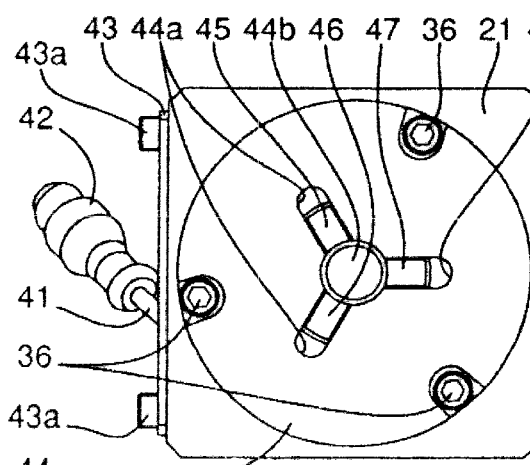

The invention will be better understood from the description which follows, given by way of non-limiting example, with reference to the accompanying drawings, in which:

FIG. 1 shows schematically a principle of operation of the device according to the invention, FIG. 2 shows schematically a top plan view of a first embodiment of a device according to the invention in the near position of disengagement, FIG. 3 shows schematically a side elevational view of the device of FIG. 2, FIG. 4 shows schematically a cross-sectional view on the line IV—IV of FIG. 3, FIG. 5 shows schematically a cross-sectional view on the line V—V of FIG. 4, FIG. 6 shows schematically a view similar to that of FIG. 2, of the device according to the invention in the far or centered position, FIG. 7 shows schematically a side elevational view of the device of FIGS. 2 and 6, FIG. 8 shows schematically a cross-sectional view on the line VIII—VIII of FIG. 7, FIG. 9 shows schematically a top plan view of another embodiment of a device according to the invention.

Referring to the schematic views of FIG. 1, a device according to the invention comprises a body 1 having actuating means 2 to actuate centering means 3 adapted to move between a near disengagement position and a far centering position.

In the near disengagement position, the piston 4a of the actuating jack 2 is in the lowered position; the rod 5a of the jack 2 is withdrawn within the body of the jack and the head 6a carried by the rod 5a driven by the piston 4a is in the low position between the elements 7a, 8a in their near position. The elements 7a, 8a are connected to jaws 9a, 10a which, because of this connection, are also in the near position, in which it is possible to lay a sheet of metal T or another piece of automobile body work, over the jaws 9a, 10a.

During movement in the direction of the arrow 11, the piston moves to reach an intermediate position 4b driving the rod 5b in the direction of arrow 11 and causing by actuation of the head 6b a movement of the elements 7b, 8b in the direction of the arrows 12; because of the connection with the pieces 7b and 8b, the jaws 9b, 10b also move in the direction of the arrows 13 to come into contact with the margins of the centering opening of the metal sheet T.

In the spaced centering position, obtained at the end of a movement, the jaws 9c, 10c fill the centering opening of the metal sheet T, so as to position this metal sheet T in the course of forming, stamping, pressing, welding, assembly or similar operations; the elements 7b, 8b are maintained in spaced position by the head 6c in the upper position located at the end of the rod 5c of the jack 2; the rod 5c is maintained in raised position by the piston 4c in its upper position: means (not shown) can also be provided to maintain the centered position in the case of release of the jack 2, for example in the case of rupture of the pneumatic circuit.

Alternatively, the angle A formed by the elements 7c, 8c with the direction of the actuating means can be so chosen as to obtain blockage between the head 6c and the elements 7c, 8c: in the case of a metal-on-metal contact, there can for example be chosen an angle A less than a predetermined angle of about five degrees of arc, and there is obtained a blockage of the same type as that obtained by self-gripping cones used for mounting a tool on a machine tool.

With reference to FIGS. 2 and 8, identical or functionally equivalent elements are given the same reference numerals.

The device according to the invention comprises a substantially parallelepipedal body 21 having on its lower surface an assembly 22 forming an actuating jack and on its upper surface a centering assembly 23.

The body 21 is machined on its lower surface so as to have a bore in which slides a piston 24 on which is mounted a rod 25 by means of a set screw 25a. The actuating rod 25 carries at its upper end head 26 secured to the rod 25 by means of a screw 26a. Elements 27, 28 are mounted slidably in two oblique bores 27a, 28a in the head 26, forming an angle with the direction of movement of the jack 22, along the axis of the rod 25.

Elements 27, 28 in the form of rods are mounted captively at their upper end in the jaws 29, 30: this mounting in the bores of the jaws 29 and 30 accordingly prevents any mechanical play between the jaws 29 or 30 and the corresponding element 27 or 28.

The lower surface of the jack 22 is constituted by a base plate 31 mounted securely on the body of the jack by screws 31a with the interposition of a suitable sealing joint 31b.

The jaws 29 and 30 are mounted captively and displaceably in an arrangement in the shape of a box having a bottom 32 pierced by openings or windows 33 for the passage of the elements 27 and 28; a cover 34 and a cylindrical connecting edge 35; the assembly comprising the base 32, the cover 34 and the annular member 35 forming a crosspiece being secured by through-screws 36 to the body 21 of the device.

The assembly of the pieces 32 to 35 thus forms a module trapping the jaws 29 and 30 with which the elements 27 and 28 are secured in the form of a cylindrical rod. These cylindrical rods 27 and 28 extend beyond the openings 33 of the recited module.

The jaws 29 and 30 are mounted slidably in the guide slot 34a of the cover 34. In the near position of disengagement shown in FIGS. 2 to 5, the jaws 29 and 30 are retracted below a protective cover 34b relative to the principal disk of the cover 34 in which are provided the slots 34a. The cover 34b also has two vertical slots 34c to permit the sliding of the jaws 29 and 30. This arrangement permits rendering the interior of the device sealed against impurities, dirt, cuttings or other soil adapted to pass between the jaws 29 and 30 in the course of their movements.

The size of the cover 34b and the slots 34c is determined as a function of the path of movement of the jaws 29 and 30 to ensure continuously a sealing against impurities, dirt, cuttings or other soil adapted to be projected onto the device. Those skilled in the art will accordingly adapt the diameter of the cover 34b and the dimensions of the slots 34c proportionally to the size of the jaws 29 and 30 and their shape.

In the case in which the angle A formed between the direction of movement of the actuating means and the elements 27 and 28 is less than five degrees, there is generally obtained a self-blocking of the device in the centered position even in the case of release of the pneumatic pressure.

However, it could also be provided to maintain the rod 25 in position by using resilient non-reversing blocking means.

Preferably, these non-reversible blocking means are constituted by cylinders 37 of polyurethane or like material mounted on axles 38 trapped in the recesses by means of screws 39. Thus, when the device is in the spaced centering position shown in FIGS. 6 to 8, the friction of the shoes 37 on the axle 25 prevents the return of the device to the close disengagement position, even in the case of a drop in pneumatic pressure.

In known manner, the device preferably comprises position detecting means 40, which can be provided to transmit by a cable 41 and a connector 42 data relative to the position of the device. Preferably, the detection means 40 are constituted by a detection module protected by a plate 43 fixed by screws 43a to the body 21 of the device.

Position indicator means such as electroluminescent diodes can be provided to indicate directly this position to the operator.

The invention, described in reference to a particular embodiment, is in no way thereby limited but on the contrary covers all modifications of shape and variations of embodiment within the spirit and scope of the invention, for example by increasing the number of centering jaws and by modifying in a corresponding manner the shapes of the cover, as shown in FIG. 9.

In this figure, a cover 44 with a protective lid 44b and three guide slots 44a covers three jaws 45, 46, 47 in a manner analogous to what has been described with reference to FIGS. 1 to 8.

Also, the control elements 27, 28 in the shape of cylindrical rods could be mounted trapped in a control head 26 and slide in the jaws 29, 30 or 45 to 47, without departing from the scope of the present invention.

What is claimed is:

1. A device for positioning and centering a workpiece, comprising a body, actuating means carried by the body, an actuating head supported by said body and movable by said actuating means, centering means carried by said body and actuated by said actuating head, slidably mounted elements carried by said body, said actuating head being movable in a first direction, said slidably mounted elements having slide surfaces forming an acute angle with said first direction, said actuating head engaging said surfaces upon movement of said actuating head in said first direction to move said centering means in at least one second direction transverse to said first direction, said at least one second direction being perpendicular to said first direction, a means mounted on said body to restrict movement of said centering means to said at least one second direction.

2. A device for positioning and centering a workpiece, comprising a body, actuating means carried by the body, an actuating head supported by said body and movable by said actuating means, centering means carried by said body and actuated by said actuating head, slidably mounted elements carried by said body, said actuating head being movable in a first direction, said slidably mounted elements having slide surfaces forming an acute angle with said first direction, said actuating head engaging said surfaces upon movement of said actuating head in said first direction to move said centering means in at least one second direction transverse to said first direction, said actuating head simultaneously engaging a plurality of said inclined surfaces, wherein said slidably mounted elements move simultaneously toward and away from each other in said at least one second direction while maintaining said sliding surfaces at said angle.

3. A device for positioning and centering a workpiece, comprising a body, actuating means carried by the body, an actuating head supported by said body and movable by said actuating means, centering means carried by said body and actuated by said actuating head, slidably mounted elements carried by said body, said actuating head being movable in a first direction, said slidably mounted elements having slide surfaces forming an acute angle with said first direction, said actuating head engaging said surfaces upon movement of said actuating head in said first direction to move said centering means in at least one second direction transverse to said first direction, which also comprises resilient non-reversing blocking means carried by the body to maintain said centering means in position in the absence of operation by said actuating means.

* * * * *